July 10, 1962 J. H. BORNZIN 3,043,073
HAY CRUSHING ROLL CONSTRUCTION
Filed April 11, 1958
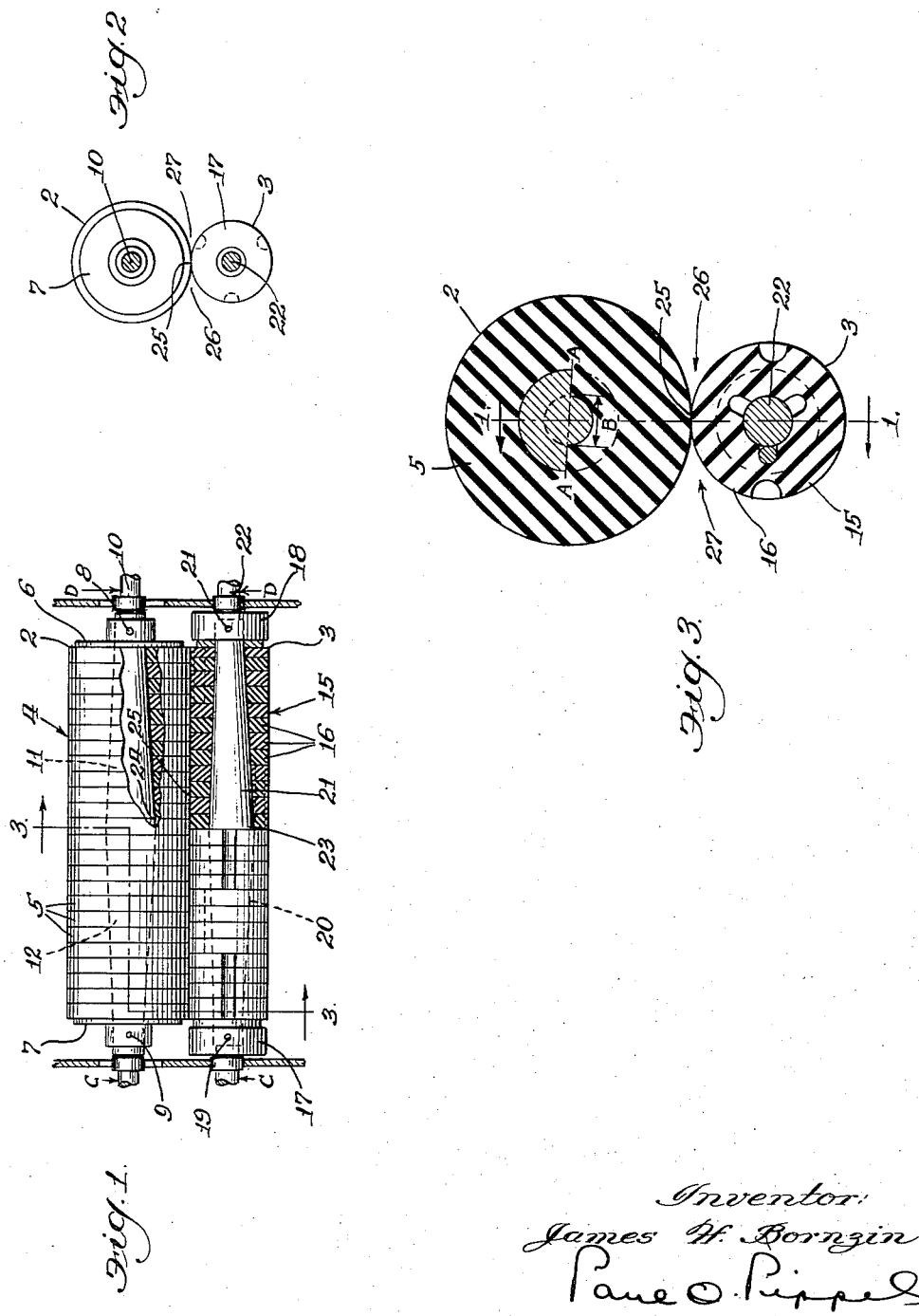
Inventor:
James H. Bornzin
Paul O. Pippel
Atty.

3,043,073
HAY CRUSHING ROLL CONSTRUCTION
James H. Bornzin, La Grange, Ill., assignor to International Harvester Company, Chicago, Ill., a corporation of New Jersey
Filed Apr. 11, 1958, Ser. No. 727,935
1 Claim. (Cl. 56—1)

This invention relates to hay crushers of the type which are adapted to be moved in the field and process swaths of hay by picking up the cut swath and crushing and re-distributing the same in the field and the invention more particularly pertains to the construction of the crushing rolls.

Crushing rolls particularly of the type which are constructed of an elastomer body such as one composed of a plurality of laminations in the form of fiber impregnated rubber disks or which comprises a solid body of rubber, it being understood that the term rubber is broadly used to designate any of the synthetic compounds well known, are provided with a center shaft. The rolls which are cylindrical are supported at opposite ends and load is applied at the ends of the rolls so that they are engaged under tremendous pressure adjacent to their bearing or mounting ends, that is their opposite ends. In order to obtain adequate pressures medially of the rolls excessive pressures must be applied at the ends inasmuch as the rolls and their shafts tend to deflect outwardly as the rolls are perssed together. My experience has shown that where cylindrical rolls are used, that the rolls very quickly burn out because of these excessive loadings at opposite ends.

My invention comprehends a novel construction of the carrying or mounting shaft for the roll bodies such that the shaft is of maximum diameter at approximately the center of the roll and progressively tapers toward opposite ends of the roll and proportioned to sustain the required loads. Thus the shaft is least deflectable or rather offers greatest resistance to deflection at the center and progressively less toward opposite ends. However, the deflection at the ends is minimal inasmuch as the shafts are thereat anchored in the bearings.

More specifically the invention contemplates the provision of shafts of maximum diameter in the region of the center of the roll and having a conical contour toward opposite ends so that it progressively tapers toward opposite ends of the roll, said shaft carrying the elastomer body.

These and other objects of the invention will become more apparent from the specification and the drawings, wherein:

FIGURE 1 is a side elevational view of a pair of crushing rolls constructed in accordance with my invention, the rolls being shown partially in section taken substantially on the line 1—1 of FIGURE 3;

FIGURE 2 is an end view of the rolls, and

FIGURE 3 is a composite sectional view taken substantially on the planes indicated by line 3—3 of FIGURE 1.

Describing the invention in detail and having particular reference to the drawings, there are shown a pair of upper and lower crushing rolls 2 and 3 of a hay crusher of the type generally shown in U.S. Patent No. 1,958,910.

The upper roll compirses a body 4 of cylindrical contour and comprised of elastomer material and is herein shown as constituted of a plurality of laminations in the form of tire carcass disks 5 which are stacked together and held in assembly by means of two end plates 6 and 7 which are pinned as at 8 and 9 to the center shaft 10.

The feature of the present invention is the construction of the center shaft which includes a maximum diameter designated A—A in FIGURE 3 at the center of the body portion 4 and at opposite sides of the diameter A—A the shaft is constructed at conical portions 11 and 12. The shaft tapers to a minimum diameter designated B (FIGURE 3) and this minimum diameter is at opposite ends of the shaft where it is mounted in bearings as well known to those skilled in the art.

Similarly the lower roll has a body 15 is cylindrical and formed of elastomer material and herein constituted of a plurality of disks 16 which are stacked together between the end caps 17 and 18, the caps 17 and 18 which are pinned as at 19 and 21 respectively, to the lower shaft 22. The shaft 22 is also bilaterally symmetrical and has a maximum diameter at 23 and the shaft tapers toward each end thus it diminishes in diameter so that there are provided two conical portions 20 and 21 tapered toward opposite ends of the shaft. It will be noted that the crown or central area 23 of the lower roll is in direct opposition and vertical alignment with the central area 24 of the upper roll and it will become readily apparent now that upon loading the rolls as C—C and D—D that in view of the thickness of the center shafts 10 and 22 and their contour a substantially uniform loading is obtainable throughout the entire engaging area 25 between the rolls and crops which are fed into the intake nip 26 and discharged through the discharge area 27 are all being pressed at substantially the same pressure throughout the entire length of the crushing rolls.

It will be realized that the thickness and taper of the shaft is the function of the pressure to be applied and length of the roll.

What is claimed is:

A hay crushing roll comprising a shaft having bearing means adjacent its ends, the said shaft being of less diameter at its ends than at its center portion and said shaft tapering from its center portion towards its ends, and a plurality of disks of elastomer material compressingly engaged on said shaft, the radial thickness of said disks gradually increasing from the center of said roller outwardly, and the surface of said roller being of cylindrical form.

References Cited in the file of this patent

UNITED STATES PATENTS

| | | |
|---|---|---|
| 1,619,371 | Rogers et al. | May 1, 1927 |
| 2,191,144 | Hornbostel | Feb. 20, 1940 |
| 2,416,123 | Siemen | Feb. 18, 1947 |
| 2,464,974 | Garvey | Mar. 22, 1949 |
| 2,694,360 | Kronlund | Nov. 16, 1954 |